(12) United States Patent
Baboescu et al.

(10) Patent No.: US 9,967,775 B2
(45) Date of Patent: May 8, 2018

(54) TRANSMITTING AN OFFLOADABLE APN VIA A BROADCAST SIGNALING METHOD

(71) Applicant: Avago Technologies General IP (Singapore) Pte. Ltd., Singapore (SG)

(72) Inventors: Florin Baboescu, Solano Beach, CA (US); Dutt Kalapatapu, Santa Clara, CA (US); Shao-Cheng Wang, Santa Clara, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 266 days.

(21) Appl. No.: 14/661,963

(22) Filed: Mar. 18, 2015

(65) Prior Publication Data

US 2015/0271706 A1    Sep. 24, 2015

Related U.S. Application Data

(60) Provisional application No. 61/955,141, filed on Mar. 18, 2014, provisional application No. 61/955,144, filed on Mar. 18, 2014.

(51) Int. Cl.
| | | |
|---|---|---|
| *H04W 36/08* | (2009.01) |
| *H04W 28/08* | (2009.01) |
| *H04W 28/02* | (2009.01) |
| *H04W 28/12* | (2009.01) |
| *H04L 12/24* | (2006.01) |
| *H04W 8/18* | (2009.01) |
| *H04W 48/00* | (2009.01) |
| *H04L 12/927* | (2013.01) |

(52) U.S. Cl.
CPC ......... *H04W 28/08* (2013.01); *H04L 41/0893* (2013.01); *H04W 28/0284* (2013.01); *H04W 28/12* (2013.01); *H04L 47/805* (2013.01); *H04W 8/18* (2013.01); *H04W 48/17* (2013.01)

(58) Field of Classification Search
CPC . H04W 28/08; H04W 28/0284; H04W 28/12; H04W 48/17; H04W 8/18; H04L 41/0893; H04L 47/805
See application file for complete search history.

(56) References Cited

U.S. PATENT DOCUMENTS

| | | | | |
|---|---|---|---|---|
| 9,155,006 B2 * | 10/2015 | Lee | ................ | H04W 36/0005 |
| 2014/0349650 A1 * | 11/2014 | Pekonen | ............... | H04W 36/22 |
| | | | | 455/436 |
| 2015/0181491 A1 * | 6/2015 | Van Phan | ............. | H04W 28/08 |
| | | | | 370/331 |

(Continued)

*Primary Examiner* — Phuc Tran
(74) *Attorney, Agent, or Firm* — Sterne, Kessler, Goldstein & Fox P.L.L.C.

(57) ABSTRACT

Systems and methods are provided for determining precedence between Radio Access Network (RAN) rules and Access Network Discovery and Selection Function (ANDSF) rules when a mobile communication device has access to more than one set of rules for offloading data. Systems and methods for transmitting an offloadable Access Point Name (APN) to a mobile communication device when RAN rules are used. Embodiments of the present disclosure combine the advantages of signaling methods when offloading information to a mobile communication device after a RAN rule has been satisfied such that a base station is able to broadcast a signal that enables all devices camped on an serving cell to offload to the APN.

20 Claims, 12 Drawing Sheets

(56) References Cited

U.S. PATENT DOCUMENTS

2015/0282246 A1* 10/2015 Teyeb ............... H04W 36/0072
  370/312
2016/0088671 A1* 3/2016 Bergstrom .......... H04W 76/045
  370/338
2016/0135100 A1* 5/2016 Teyeb ............... H04W 36/0055
  370/331
2016/0198390 A1* 7/2016 Aminaka .............. H04W 16/32
  370/328

* cited by examiner

TRANSMITTING AN OFFLOADABLE APN VIA A BROADCAST SIGNALING METHOD

CROSS REFERENCE TO RELATED APPLICATIONS

This application claims the benefit of U.S. Provisional Patent Application No. 61/955,141, filed on Mar. 18, 2014 and U.S. Provisional Patent Application No. 61/955,144, filed on Mar. 18, 2014, both of which are incorporated by reference herein in their entireties.

FIELD

This application relates generally to wireless communications, including offloading within a communication environment.

BACKGROUND

The cellular network industry and service providers have been developing inter-system offloading solutions to alleviate congestion within communication environments by delivering data originally targeted for cellular networks to one or more other complementary technologies such as Wireless Local Area Network (WLAN) technology. Inter-system offloading can reduce congestion issues and provide flexible bandwidth for load-balancing.

BRIEF DESCRIPTION OF THE DRAWINGS/FIGURES

The accompanying drawings, which are incorporated in and constitute part of the specification, illustrate embodiments of the disclosure and, together with the general description given above and the detailed descriptions of embodiments given below, serve to explain the principles of the present disclosure. In the drawings.

Figure 1:
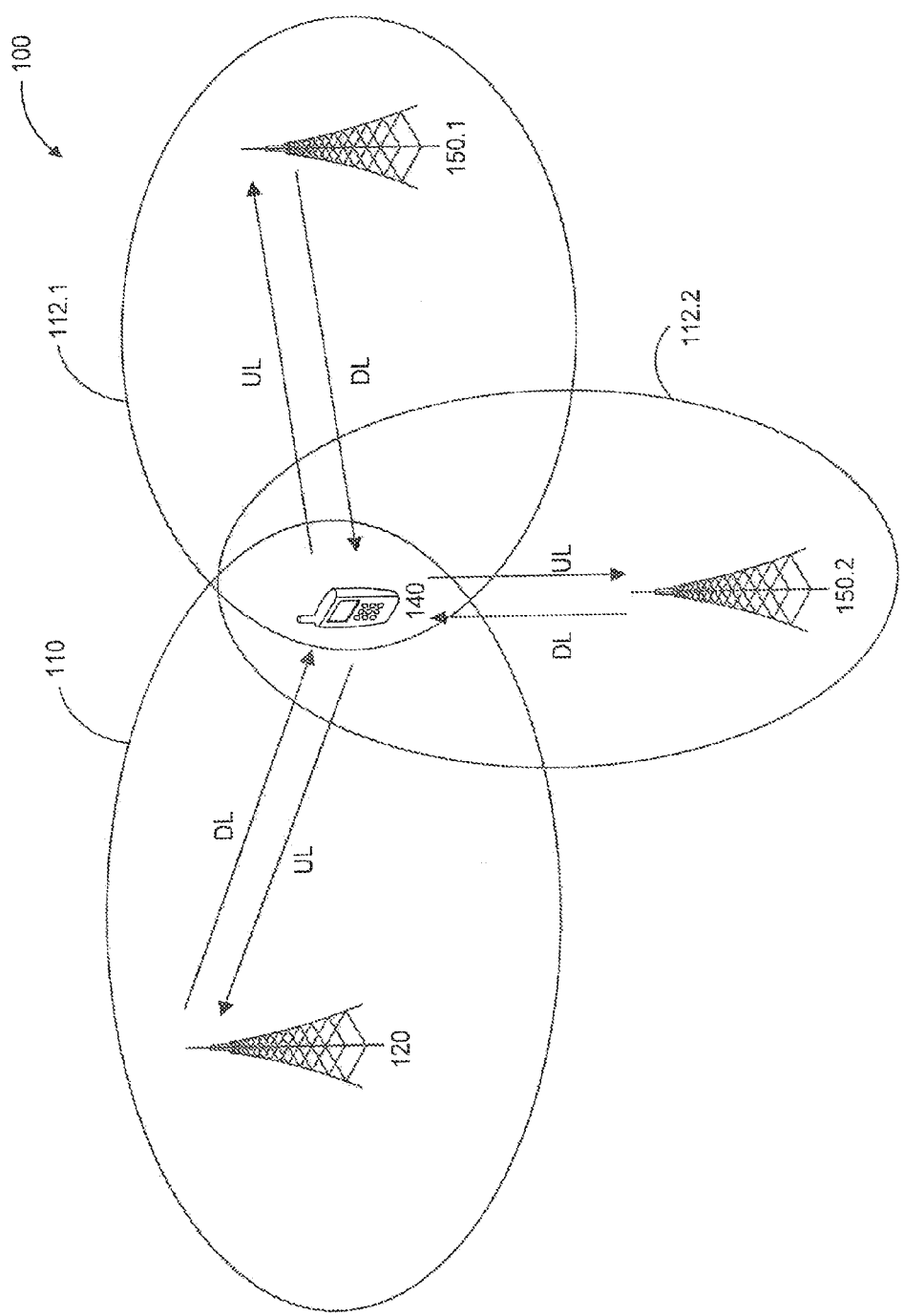
FIG. 1 illustrates an example network environment.

Features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

In the following description, numerous specific details are set forth to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of this discussion, the term "module" shall be understood to include one of software, or firmware, or hardware (such as circuits, microchips, processors, or devices, or any combination thereof), or any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

In the following disclosure, terms defined by the Long-Term Evolution (LTE) standard are sometimes used. For example, the term "eNodeB" or "eNB" is used to refer to what is commonly described as a base station (BS) or a base transceiver station (BTS) in other standards. The term "User Equipment (UE)" is used to refer to what is commonly described as a mobile station (MS) or mobile terminal in other standards. The LTE standard is developed by the 3rd Generation Partnership Project (3GPP) and described in the 3GPP specification and International Mobile Telecomunnications-2000 (IMT-2000) standard, all of which are incorporated by reference in their entirety. Further, although exemplary embodiments are described with reference to LTE, the more generic terms "mobile communication device" and "base station" are used herein except where otherwise noted to refer to the LTE terms "User Equipment (UE)" and "eNodeB/eNB," respectively.

As will be apparent to one of ordinary skill in the relevant art(s) based on the teachings herein, exemplary embodiments are not limited to the LTE standard, and can be applied to other cellular communication standards, including (but not limited to) Evolved High-Speed Packet Access (HSPA+), Wideband Code Division Multiple Access (W-CDMA), CDMA2000, Time Division-Synchronous Code Division Multiple Access (TD-SCDMA), Global System for Mobile Communications (GSM), General Packet Radio Service (GPRS), Enhanced Data Rates for GSM Evolution (EDGE), and Worldwide Interoperability for Microwave Access (WiMAX) (IEEE 802.16) to provide some examples. Further, exemplary embodiments are not limited to cellular communication networks and can be used or implemented in other kinds of wireless communication access networks, including (but not limited to) WLAN (IEEE 802.11), Bluetooth, Near-field Communication (NFC) (ISO/IEC 18092), ZigBee (IEEE 802.15.4), and/or Radio-frequency identification (RFID), to provide some examples. These various standards and/or protocols are each incorporated by reference in their entirety.

For the purposes of this discussion, the term "processor circuitry" shall be understood to be one or more: circuit(s), processor(s), or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to embodiments described herein. Alternatively, the processor can access an internal and/or external memory to retrieve instructions stored in the memory, which when executed by the processor, perform the corresponding function(s) associated with the processor.

1. Overview

In certain circumstances, two or more offloading policies used by a mobile communication device can conflict. For example, a mobile communication device can have access to both Radio Access Network (RAN) rules and Access Network Discovery and Selection Function (ANDSF) rules for determining when to offload data. Embodiments of the present disclosure provide systems and methods for determining precedence between RAN rules and ANDSF rules when a mobile communication device has access to more than one set of rules for offloading data.

When RAN rules are used for offloading data, offload information can be sent from a base station to a mobile communication device using a variety of signaling methods, each of which has its own advantages and disadvantages. Embodiments of the present disclosure provide systems and methods that combine the advantages of these signaling methods when offloading information to a mobile communication device after a RAN rule has been satisfied such that a base station is able to broadcast a signal that enables all devices camped on an serving cell to offload to a particular Access Point Name (APN).

2. Communication Environment

FIG. 1 illustrates an example communication environment 100 that includes one or more base stations 120, one or more mobile communication devices 140, and one or more access points (AP)s 150. The base station(s) 120, mobile communication device(s) 140, and AP(s) 150 each include one or more processors, circuitry, and/or logic that is configured to communicate via one or more wireless technologies. The one or more processors can include (and be configured to access) one or more internal and/or external memories that store instructions and/or code that, when executed by the processor(s), cause the processor(s) to perform one or more operations to facilitate communications via one or more wireless technologies as discussed herein. Further, one or more of the mobile communication devices 140 can be configured to support co-existing wireless communications. The mobile communication device(s) 140 can include, for example, a transceiver having one or more processors, circuitry, and/or logic that is configured to transmit and/or receive wireless communications via one or more wireless technologies within the communication environment 100.

The base station(s) 120 and AP(s) 150 each include one or more processors, circuitry, and/or logic that is configured to: (1) receive one or more wired communications via one or more well-known wired technologies (e.g., within a core (backhaul) network) and transmit one or more corresponding wireless communications via one or more wireless technologies within the communication environment 100, (2) receive one or more wireless communications within the communication environment 100 via one or more wireless technologies and transmit one or more corresponding wired communications via one or more well-known wired technologies within a core network, and (3) to transmit and/or receive wireless communications via one or more wireless technologies within the communication environment 100. The wireless technologies can include, for example, one or more wireless protocols discussed above. The number of mobile communication devices 140, base stations 120 and/or APs 150 are not limited to the numbers shown in the exemplary embodiment illustrated in FIG. 1, and the communication environment 100 can include any number of mobile communication devices 140, base stations 120 and/or APs 150 as would be understood by those skilled in the relevant arts without departing from the spirit and scope of the present disclosure.

The mobile communication device 140 can be configured to communicate with the base station 120 in a serving cell or sector 110 of the communication environment 100, to communicate with the access point (AP) 150.1 in a wireless local area network (WLAN) 112.1. and/or to communicate with the AP 150.2 in a WLAN 112.2. For example, the mobile communication device 140 receives signals on one or more downlink (DL) channels and transmits signals to the base station 120, AP 150.1 and/or the AP 150.2 on one or more respective uplink (UL) channels.

In exemplary embodiments, the mobile communication device 140 can be configured to utilize the Access Network Query Protocol (ANQP) to exchange information with the APs 150. Further, one or more of the APs 150 can be Hotspot 2.0 compliant, as defined in the IEEE 802.11u standard. In these examples, the mobile communication device 140 can be configured to exchange backhaul bandwidth and/or data rate information, connectivity information, capability information, and any other connection and/or communication information associated with the AP(s) 150 as would be understood by those skilled in the relevant arts utilizing the ANQP.

In an exemplary embodiment, one or more of the base stations 120 includes one or more processors, circuitry, and/or logic that is configured for communications conforming to 3GPP's Long-Term Evolution (LTE) specification (e.g., the base station is an LTE base station), one or more of the APs 150 includes one or more processors, circuitry, and/or logic that is configured for communications conforming to IEEE's 802.11 WLAN specification (e.g., the AP 150 is a WLAN access point), and one or more of the mobile communication devices 140 include one or more processors, circuitry, and/or logic that is configured for communications conforming to 3GPP's LTE specification and IEEE's 802.11 WLAN specification. The one or more processors, circuitry, and/or logic of the mobile communication device 140 can be further configured for communications conforming to one or more other 3GPP and/or non-3GPP protocols via one or more device-to-device communication networks established with one or more other mobile communication devices. That is, the mobile communication device(s) 140 are configured to wirelessly communicate with the base station(s) 120 utilizing 3GPP's LTE specification, with the AP(s) 150 utilizing IEEE's 802.11 WLAN specification, and/or with one or more other mobile communication devices 140 directly utilizing 3GPP's LTE specification, IEEE's 802.11 WLAN specification, and/or one or more other 3GPP and/or non-3GPP protocols. In this example, the serving cell or sector 110 is an LTE serving cell or sector and the WLANs 112 are WLANs utilizing the 802.11 WLAN specification. In an exemplary embodiment, the communication of the mobile communication device 140 with one or more other mobile communication devices 140 can be a device-to-device communication that bypasses the base station 120, the AP 150, and/or any other base station and/or AP.

Those skilled in the relevant art(s) will understand that the base station(s) 120, the AP(s) 150, and the mobile communication device(s) 140 are not limited to these exemplary 3GPP and non-3GPP wireless protocols, and the base station(s) 120, the AP(s) 150, and/or the mobile communication device(s) 140 can be configured for wireless communications conforming to one or more other 3GPP and/or non-3GPP wireless protocols in addition to, or in the alternative to, the wireless protocols discussed herein.

Examples of the mobile communication device 140 include (but are not limited to) a mobile computing device—such as a laptop computer, a tablet computer, a mobile telephone or smartphone, a "phablet," a personal digital assistant (PDA), and mobile media player; and a wearable computing device—such as a computerized wrist watch or "smart" watch, and computerized eyeglasses. In some embodiments, the mobile communication device 140 may be a stationary device, including, for example, a stationary computing device—such as a personal computer (PC), a desktop computer, a computerized kiosk, and an automotive/aeronautical/maritime in-dash computer terminal.

2.1 Base Station

Figure 2:
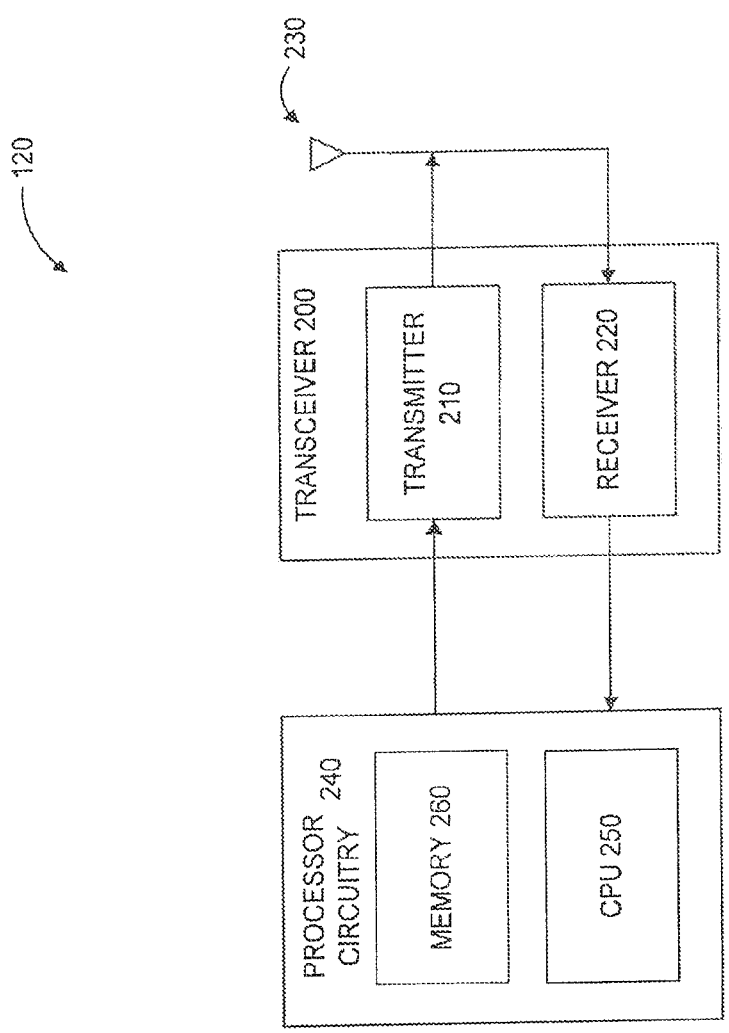
FIG. 2 illustrates a base station according to an exemplary embodiment of the present disclosure.

FIG. 2 illustrates the base station 120 according to an exemplary embodiment of the present disclosure. For example, the base station 120 can include a transceiver 200 communicatively coupled to processor circuitry 240. The transceiver 200 includes one or more processors, circuitry, and/or logic that is configured to transmit and/or receive wireless communications via one or more wireless technologies within the communication environment 100. In particular, the transceiver 200 can include a transmitter 210 and a receiver 220 that have one or more processors, circuitry, and/or logic configured to transmit and receive wireless communications, respectively, via one or more antennas 230. Those skilled in the relevant art(s) will recognize that the transceiver 200 can also include (but are not limited to) a digital signal processor (DSP), modulator and/or demodulator, a digital-to-analog converter (DAC) and/or an analog-to-digital converter (ADC), and/or a frequency converter (including mixers, local oscillators, and filters) to provide some examples. Further, those skilled in the relevant art(s) will recognize that the antenna 230 may include an integer array of antennas, and that the antenna 230 may be capable of both transmitting and receiving wireless communication signals. For example, the base station 120 can be configured for wireless communication utilizing a Multiple-input Multiple-output (MIMO) configuration.

In an exemplary embodiment, the transceiver 200 is configured for wireless communications conforming to one or more wireless protocols defined by 3GPP. For example, the transceiver 200 is configured for wireless communications conforming to 3GPP's LTE specification. In this example, the transceiver 200 can be referred to as LTE transceiver 200. Those skilled in the relevant art(s) will understand that the transceiver 200 is not limited to communication conforming to 3GPP's LTE specification, and can be configured for communications that conform to one or more other 3GPP protocols and/or one or more non-3GPP protocols. It should be appreciated that the transceiver 200 can be referred to by one or more other 3GPP and/or non-3GPP protocols in embodiments where the transceiver 200 is configured for such other communications conforming to the other 3GPP and/or non-3GPP protocols.

The processor circuitry 240 can include one or more processors (CPUs) 250 and/or circuits configured to carry out instructions to perform arithmetical, logical, and/or input/output (I/O) operations of the base station 120 and/or one or more components of the base station 120. The processor circuitry 240 can further include a memory 260 that stores data and/or instructions, where when the instructions are executed by the processor(s) 250, perform the functions described herein. The memory 260 can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory 260 can be non-removable, removable, or a combination of both.

2.2 Access Point

Figure 3:
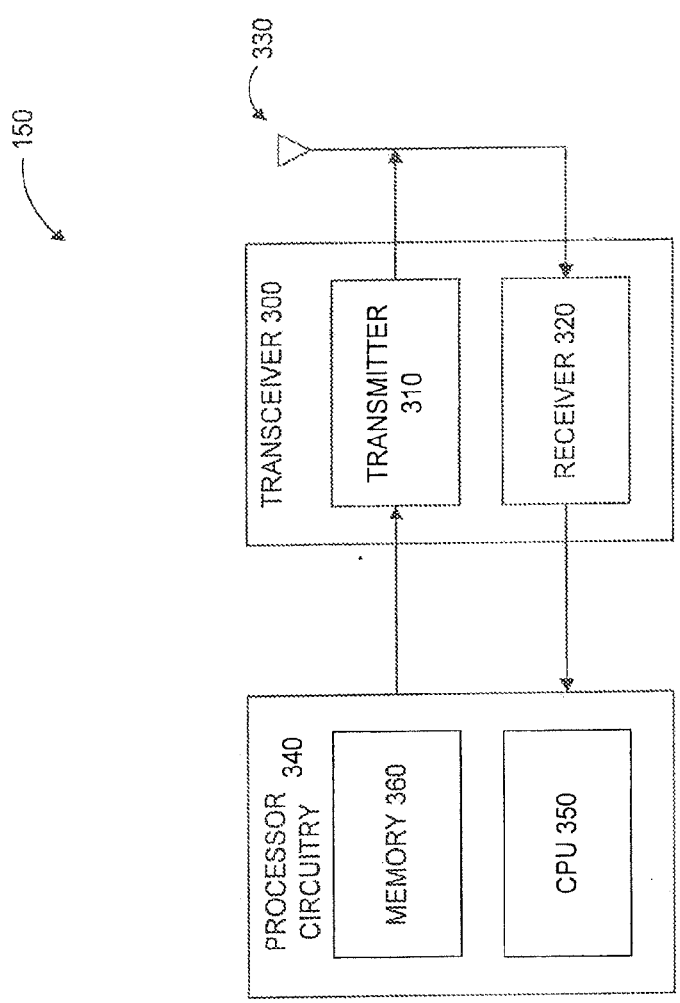
FIG. 3 illustrates an access point according to an exemplary embodiment of the present disclosure.

FIG. 3 illustrates the access point (AP) 150 according to an exemplary embodiment of the present disclosure. For example, the AP 150 can include a transceiver 300 communicatively coupled to processor circuitry 340. The transceiver 300 is similar to the transceiver 200 and includes one or more processors, circuitry, and/or logic that is configured to transmit and/or receive wireless communications via one or more wireless technologies within the communication environment 100. In particular, the transceiver 300 can similarly include a transmitter 310 and a receiver 320 that have one or more processors, circuitry, and/or logic configured to transmit and receive wireless communications, respectively, via one or more antennas 330. Those skilled in the relevant art(s) will recognize that the transceiver 300 can also include (but are not limited to) a digital signal processor (DSP), modulator and/or demodulator, a digital-to-analog converter (DAC) and/or an analog-to-digital converter (ADC), and/or a frequency converter (including mixers, local oscillators, and filters) to provide some examples. Further, those skilled in the relevant art(s) will recognize that the antenna 330 may include an integer array of antennas, and that the antenna 330 may be capable of both transmitting and receiving wireless communication signals. For example, the AP 150 can be configured for wireless communication utilizing a Multiple-input Multiple-output (MIMO) configuration.

In an exemplary embodiment, the transceiver 300 is configured for wireless communications conforming to one or more non-3GPP protocols. For example, the transceiver 300 is configured for wireless communications conforming to IEEE's 802.11 WLAN specification. In this example, the transceiver 300 can be referred to as WLAN transceiver 300. Those skilled in the relevant art(s) will understand that the transceiver 300 is not limited to communication conforming to IEEE's 802.11 WLAN specification, and can be configured for communications that conform to one or more other non-3GPP protocols and/or one or more 3GPP protocols. It should be appreciated that the transceiver 300 can be referred to by one or more other 3GPP and/or non-3GPP protocols in embodiments where the transceiver 300 is configured for such other communications conforming to the other non-3GPP and/or 3GPP protocols.

The processor circuitry 340 is similar to the processor circuitry 240 and includes one or more processors, circuitry, and/or logic that is configured to control the overall operation of the AP 150, including the operation of the transceiver 300. The processor circuitry 340 can include one or more processors (CPUs) 350 and/or circuits configured to carry out instructions to perform arithmetical, logical, and/or input/output (I/O) operations of the AP 150 and/or one or more components of the AP 150. The processor circuitry 340 can further include a memory 360 that stores data and/or instructions, where when the instructions are executed by the processor(s) 350, perform the functions described herein. The memory 360 can be any well-known volatile and/or non-volatile memory similar to the memory 260 described above. Similarly, the memory 360 can be non-removable, removable, or a combination of both.

2.3 Mobile Communication Device

Figure 4:
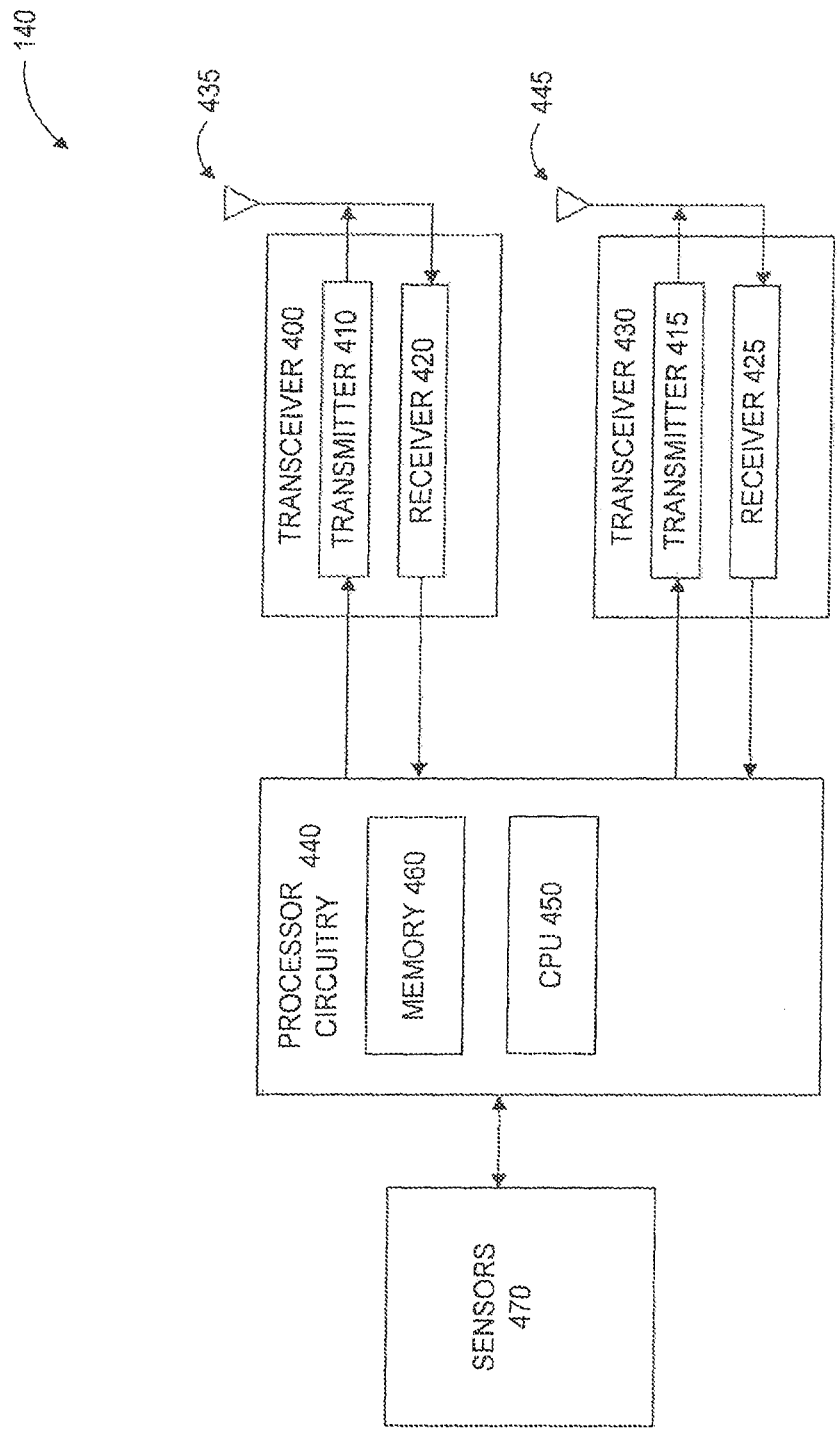
FIG. 4 illustrates a mobile communication device according to an exemplary embodiment of the present disclosure.

FIG. 4 illustrates the mobile communication device 140 according to an exemplary embodiment of the present disclosure. The mobile communication device 140 can include processor circuitry 440 communicatively coupled to an LTE transceiver 400 and a WLAN transceiver 430. The mobile communication device 140 can be configured for wireless communications conforming to one or more wireless protocols defined by 3GPP and/or one or more non-3GPP wireless protocols. In an exemplary embodiment, the mobile communication device 140 is configured for wireless communication conforming to 3GPP's LTE specification and for wireless communication conforming to IEEE's 802.11 WLAN specification. Those skilled in the relevant art(s) will understand that the mobile communication device 140 is not limited to these exemplary 3GPP and non-3GPP wireless protocols, and the mobile communication device 140 can be configured for wireless communications conforming to one or more other 3GPP and/or non-3GPP wireless protocols in addition to, or in the alternative to, the wireless protocols discussed herein, and/or to a subset of the LTE and WLAN specifications discussed above.

The LTE transceiver 400 includes one or more processors, circuitry, and/or logic that is configured for transmitting and/or receiving wireless communications conforming to 3GPP's LTE specification. In particular, the LTE transceiver 400 can include an LTE transmitter 410 and an LTE receiver 420 that have one or more processors, circuitry, and/or logic configured for transmitting and receiving wireless communications conforming to 3GPP's LTE specification, respectively, via one or more antennas 435. Transceiver 400 need not be limited to LTE, and could operate according to one or more other 3GPP and/or non-3GPP protocols, as will be understood by those skilled in art.

The WLAN transceiver 430 includes one or more processors, circuitry, and/or logic that is configured for transmitting and/or receiving wireless communications conforming to IEEE's 802.11 WLAN specification. In particular, the WLAN transceiver 430 can include a WLAN transmitter 415 and a WLAN receiver 425 that have one or more processors, circuitry, and/or logic configured for transmitting and receiving wireless communications conforming to IEEE's 802.11 WLAN specification, respectively, via one or more antennas 445. Transceiver 430 need not be limited to WLAN, and could operate according to one or more other 3GPP and/or non-3GPP protocols, as will be understood by those skilled in art.

Regarding the LTE transceiver 400 and the WLAN transceiver 430, the processes for transmitting and/or receiving wireless communications can include (but are not limited to) a digital signal processor (DSP), modulator and/or demodulator, a digital-to-analog converter (DAC) and/or an analog-to-digital converter (ADC), and/or a frequency converter (including mixers, local oscillators, and filters) to provide some examples. Further, those skilled in the relevant art(s) will recognize that antennas 435 and/or 445 may include an integer array of antennas, and that the antennas may be capable of both transmitting and receiving wireless communication signals. It will also be understood by those skilled in the relevant art(s) that any combination of the LTE transceiver 400 and WLAN transceiver 430, as well as one or more other transceivers, circuits, and/or processors may be embodied in a single chip and/or die.

The processor circuitry 440 includes one or more processors, circuitry, and/or logic that is configured to control the overall operation of the mobile communication device 140, including the operation of the LTE transceiver 400 and WLAN transceiver 430. The processor circuitry 440 can include one or more processors (CPUs) 450 and/or circuits configured to carry out instructions to perform arithmetical, logical, and/or input/output (I/O) operations of the mobile communication device 140 and/or one or more components of the mobile communication device 140. The processor circuitry 440 can further include a memory 460 that stores data and/or instructions, where when the instructions are executed by the processor(s) 450, perform the functions described herein. Similarly, the memory 460 can be any well-known volatile and/or non-volatile memory, and can be non-removable, removable, or a combination of both.

In an exemplary embodiment, the mobile communication device 140 includes one or more other transceivers (not shown) configured to communicate via one or more 3GPP protocols, one or more non-3GPP protocols, and/or one or more other well-known communication technologies. In an exemplary embodiment, the one or more other transceivers can be configured for navigational purposes utilizing one or more well-known navigational systems, including the Global Navigation Satellite System (GNSS), the Russian Global Navigation Satellite System (GLONASS), the European Union Galileo positioning system (GALILEO), the Japanese Quasi-Zenith Satellite System (QZSS), the Chinese BeiDou navigation system, and/or the Indian Regional Navigational Satellite System (IRNSS) to provide some examples. Further, the mobile communication device 140 can include one or more positional and/or movement sensors 470 (e.g., GPS, accelerometer, gyroscope sensor, etc.) implemented in (and/or in communication with) the mobile communication device 140. Here, the location and/or movement of the mobile communication device 140 can be determined using one or more transceivers configured for navigation purposes, one or more of the positional and/or movement sensors 470, and/or one or more positional determinations using signal characteristics relative to one or more base stations and/or access points.

3. Offloading

In an exemplary embodiment, the processor circuitry 440 is configured to offload communications via the LTE or WLAN transceivers 400, 430. For example, the processor circuitry 400 can offload data from one or more base stations 120 and/or APs 150 to one or more other base stations 120 and/or AP 150. Alternatively, the processor circuitry 400 can offload communications via the LTE transceiver 400 to the WLAN transceiver 430, and/or can offload communications via the WLAN transceiver 430 to the LTE transceiver 400. The offloading can be based on one or more offloading policies provided to the mobile device 140 by one or more service providers and received via the LTE transceiver 400 and/or the WLAN transceiver 430. Further, the offloading policies can be stored in the memory 460, and accessed and executed by the CPU 450 to effectuate the offloading of communications. For example, the processor circuitry 440 can be configured to control the mobile communication device 140 to offload communications with the base station 120 to the AP 150.1 based on one or more of the offloading policies. In exemplary embodiments, the offloading policies can include priority information and/or utility information that can be used to determine an appropriate offloading policy to be implemented by the mobile communication device 140. In these examples, the mobile communication device 140 can select an offloading policy from one or more offloading polices based on, for example, utility information associated with the offloading policy.

The offloading of communications with the mobile communication device 140 can be from the base station 120 to the AP 150, from the AP 150 to the base station 120, or a combination of both. For example, the mobile communication device 140 can be configured to offload communications with the base station 120 to the AP 150 based on one or more offloading policies provided to the mobile communication device 140 by one or more service providers. The offloading policies can be application specific for separate applications (e.g. voice, data, background, push applications) operating on the mobile communication device 140. In an exemplary embodiment, the offloading policies are maintained in a policy server that is communicatively coupled to the mobile communication device 140 via one or more communication networks associated with the one or more service providers. For example, the policy server can be communicatively coupled to the base station 120 (via a backhaul connection), and then wirelessly provided to the mobile communication device 140 via the LTE network supported by the base station 120.

The offloading policies can be received by the mobile communication device 140 via the LTE transceiver 400 and/or the WLAN transceiver 430 from the one or more service providers. Further, the offloading policies can be either statically pre-configured on the mobile communication device 140 or dynamically updated by the service provider and provided to the mobile communication device 140. The policies can be stored in the memory 460, and accessed and executed by the CPU 450 to effectuate the offloading of communications between the mobile communication device 140 and base station 120 and/or the AP 150. The offloading policies can include, for example, one or more rules associated with the location of one or more communication networks, priority and/or utility information associated with one or more communication networks and/or one or more applications operable by the mobile communication device 140, the location of the mobile communication device 140, the available communication networks at specified locations, the day of week, the time of day, discovery information corresponding to the various communication networks, and/or any other information as would be apparent to those skilled in the relevant arts.

In operation, the mobile communication device 140 can analyze one or more of the parameters defined in the offloading policy (e.g., utility information) based on the operating state of the mobile communication device 140 (e.g., which applications are currently being utilized by the mobile communication device 140). Based on this analysis, the mobile communication device 140 determines whether to perform an offloading operation to another communication network, and if so, which communications and to what other communication network the communications are to be offloaded to.

3.1 ANDSF Framework

In an exemplary embodiment, the one or more offloading policies conform to, and/or are associated with, the Access Network Discovery and Selection Function (ANDSF) framework as defined in the 3GPP TS 24.312 specification, which is incorporated herein by reference in its entirety. The ANDSF framework is an entity introduced by 3GPP as part of the Release 8 set of specifications, within an Evolved Packet Core (EPC) of the System Architecture Evolution (SAE) for 3GPP compliant communication networks. The ANDSF framework assists the mobile communication device 140 to discover one or more non-3GPP communication networks (e.g., WLAN, WIMAX, etc.) that can be used for data communications in addition to one or more 3GPP communication networks (e.g., LTE, HSPA, etc.) and to provide the mobile communication device 140 with rules (e.g., policy conditions) that control the connection to the 3GPP and/or non-3GPP communication networks. The use of operational parameters, policies, and/or conditions within an operational framework for inter-system offloading, and the transmission of the operational framework to a mobile communication device, is further described in U.S. patent application Ser. No. 14/149,681 filed Jan. 7, 2014, entitled "Systems And Methods For Network Discovery And Selection Using Contextual Information," and U.S. patent application Ser. No. 14/167,615 filed Jan. 29, 2014, entitled "System And Methods For Anonymous Crowdsourcing Of Network Condition Measurements," each of which is incorporated herein by reference in its entirety.

The ANDSF framework is defined by one or more ANDSF Management Objects (MO) that are generated by the service providers of the one or more 3GPP communication networks and provided to the mobile communication device 140. The ANDSF MOs of the framework can provide the mobile communication device 140 with the following information, based on the service provider's configuration:

1. Inter-System Mobility Policy (ISMP)—network selections rules for a mobile communication device with no more than one active communication network connection (e.g., either LTE or WLAN).
2. Inter-System Routing Policy (ISRP)—network selection rules for the mobile communication device with potentially more than one active communication network connection (e.g., both LTE and WLAN). Here, the mobile communication device may employ IP Flow Mobility (IFOM), Multiple Access Packet Data Networks (PDN)

Connectivity (MAPCON) or non-seamless WLAN offloading according to operator policy and user preferences.

3. Discovery Information—a list of networks that may be available in the vicinity of the mobile communication device and information assisting the mobile communication device to expedite the connection to these networks.

In these examples, the ANDSF framework assists the mobile communication device 140 to discover communication networks in the vicinity of the mobile communication device 140 and prioritize/manage connections to the communication networks. The policies set forth in the ANDSF framework can be statically pre-configured on the mobile communication device or dynamically updated by the service provider and provided to the mobile communication device 140 via the Open Mobile Alliance (OMA) Device Management (DM) protocol specified by the OMA DM Working Group and the Data Synchronization (DS) Working Group. The OMA DM protocol is incorporated herein by reference in its entirety.

3.2 ANDSF Management Object

The ANDSF framework can be referred to as an ANDSF Management Object (MO) that include various rules, conditions, parameters, and other information organized into one or more "nodes" that may have one or more "leaf objects" descending therefrom. The nodes and leaf objects define, for example, one or more rules, one or more conditions, one or more parameters, and/or discovery information that are used by the mobile communication device 140 in governing the ISMP, ISRP, and/or Discovery processing by the mobile communication device 140. For example, the ANDSF MO is used by the mobile communication device 140 to establish communications via one or more non-3GPP communication networks (e.g., WLAN communication network on AP 150) and effectuate offloading of the mobile communication device's 140 communications via the base station 120 to, for example, the AP 150.

The ANDSF MOs can be maintained by an ANDSF server that is communicatively coupled to the mobile communication device 140 via one or more communication networks associated with the one or more service providers (e.g., via the base station 120). The various rules and information within the ANDSF MO can be either statically pre-configured on the mobile communication device 140 or dynamically updated by the service provider and provided to the mobile communication device 140. The ANDSF MO can be stored in the memory 460 of the mobile communication device 140, and accessed and executed by the CPU 450 to effectuate the offloading of communications between the mobile communication device 140 and base station 120 and/or the AP 150.

In operation, when a condition within the ANDSF MO becomes "active" (e.g., the mobile communication device 140 moves within range of a communication network serving cell that is specified in a node/leaf of the of the ANDSF MO), the mobile communication device 140 notifies the event to the ANDSF server and requests the Inter-system Discovery Information based on the preferred access technology recommended in the MO (e.g., WLAN). The ANDSF server will provide the mobile communication device 140 with the communication network's identification information (e.g., WLAN Hotspot SSIDs) in the vicinity and related access information (e.g., WLAN security keys). The mobile communication device 140 uses this information to connect to the other communication network. Further, the mobile communication device 140 can offload communications originally destined for the original serving communication network (e.g., LTE) to the other communication network based on rules set forth in the ANDSF MO.

In exemplary embodiments, identification information, connection information, backhaul bandwidth and/or data rate information, capability information, and/or any other information associated with the AP(s) 150 as would be understood by those skilled in the relevant arts can be provided by the AP(s) 150 to the mobile communication device(s) 140 utilizing the Access Network Query Protocol (ANQP). In exemplary embodiments, the AP(s) can be configured to provide information to the base station(s) 120 through one or more backhaul connections. The information provided to the base stations 120 can include information that can be provided by the AP(s) 150 to mobile communication device(s) 140 using the Access Network Query Protocol (ANQP). For example, the AP(s) 150 can provide identification information, connection information, backhaul bandwidth and/or data rate information, capability information, and/or any other information associated with the AP(s) 150 to the base station(s) 120 through the backhaul connection. In these examples, the information provided to the base station(s) 120 that are generally provided by the AP(s) 150 using the ANQP can be referred to one or more ANQP parameters.

The base station(s) 120 can be configured to then provide the information obtained from the AP(s) (e.g., the ANQP parameters) to the mobile communication device(s) 140 using a radio access network (e.g., LTE network). In these examples, the mobile communication device(s) 140 can utilize the information associated with the AP(s) 150 that has been received via the base station(s) 120 to connect to, and communicate with, the AP(s) 150. In an exemplary embodiment, the ANQP parameters can be defined in an ANDSF framework and distributed to the mobile communication device(s) 140 within an ANDSF MO.

In exemplary embodiments, the AP(s) 150 that are configured to exchange information with one or more base station(s) 120 can be associated with one or more service providers that are associated with the corresponding base station(s) 120. That is, the exchange of information between the AP(s) 150 and base station(s) 120 can be effectuated by a common service provider that supports both the AP 150 and the base station 120.

4. Priority, Precedence and Interaction between RAN Rules ANDSF

In an exemplary embodiment, two or more offloading policies used by the mobile communication device(s) 140 can conflict. For example, the mobile communication device(s) 140 can be provisioned with user-specified offloading rules, operator-provisioned offloading rules (e.g., ANDSF rules distributed from an operator server to a core network), and Radio Access Network (RAN) rules that are implemented into a cellular modem of the mobile communication device(s) 140 or are sent to the mobile communication device(s) 140 by the base station 120 through dedicated signaling.

For example, in an embodiment, the user-specified offloading rules can be manually configured by a user (e.g., via altering settings using an interface operating on mobile communication device(s) 140). Alternatively the user-specified offloading rules can be configured for a particular user.

In an embodiment, the RAN rules include a set of thresholds for RAN-related parameters (e.g., signal strength, interference level, WLAN thresholds, etc.). Based on these parameters, the mobile communication device(s) 140 can determine when to offload traffic. For example, if the mobile communication device(s) 140 is at the edge of a cell and a WLAN access point is available, the mobile communication device(s) 140 can determine whether to offload traffic to the WLAN access point based on one or more thresholds set forth in the RAN rules associated with offloading traffic (e.g., the mobile communication device(s) 140 can determine to offload traffic if the signal strength of the current network is below a specified threshold and if the signal strength of the WLAN network is above a specified threshold).

As discussed above, the ANDSF policies are distributed from an operator server to a core network. In an embodiment, the mobile communication device(s) 140 can receive ANDSF rules from both a home network and a visited network. For example, if the mobile communication device(s) 140 is owned by a user in the United States, the mobile communication device(s) 140 can get ANDSF rules provisioned from an operator in the United States. When the user of mobile communication device(s) 140 is traveling in Europe, the mobile communication device(s) 140 can be provisioned with ANDSF rules from an operator in Europe that has a roaming agreement with the home operator.

Because the user-specified rules, ANDSF rules (which can be provisioned by both home and visited operators), and RAN rules can conflict, systems and methods for determining which rules take precedence are needed. In an embodiment, user-specific rules can always take precedence over RAN rules and ANDSF rules. Embodiments of the present disclosure provide systems and methods for determining whether RAN rules or ANDSF rules take precedence when multiple conflicting rule sets are available.

4.1 Use Case Scenarios

Table 1 below provides a set of rules for determining precedence between RAN rules and ANDSF rules in accordance with an embodiment of the present disclosure.

TABLE 1

| Scenario Number | Existing H-ANDSF Policy | Existing V-ANDSF Policy | Existing RAN Rules | Rules to Use |
|---|---|---|---|---|
| 1 | Yes | No | No | Home ANDSF |
| 2 | Yes | Yes | No | Visited ANDSF (primarily) |
| 3 | Yes | No | Yes | Home ANDSF |
| 4 | No | Yes | Yes | Visted ANDSF |
| 5 | Yes | Yes | Yes | Visited ANDSF (primarily) |
| 6 | No | No | Yes | RAN Rules |

In Scenario 1, the mobile communication device(s) 140 is provisioned with an ANDSF policy from a home operator, and no visited ANDSF rules or RAN rules are available. In this scenario, the mobile communication device(s) 140 will use the home ANDSF policy for network selection and traffic steering.

In Scenario 2, the mobile communication device(s) 140 is provisioned with an ANDSF policy from a home operator and an ANDSF policy from a visited operator, and no RAN rules are available. In this scenario, the mobile communication device(s) 140 will use the visited ANDSF policy for network selection and traffic steering. In an embodiment, the mobile communication device(s) 140 is configured to prefer the visited ANDSF policy over the home ANDSF policy when a visited ANDSF policy is available.

In Scenario 3, the mobile communication device(s) 140 is provisioned with RAN rules and an ANDSF policy from a home operator, and no visited ANDSF rules are available. In this scenario, the mobile communication device(s) 140 will use the home ANDSF policy for network selection and traffic steering. In an embodiment, the mobile communication device(s) 140 can use some of the RAN assistance parameters to enhance the ANDSF network selection policies in this scenario.

In Scenario 4, the mobile communication device(s) 140 is provisioned with RAN rules and an ANDSF policy from a visited operator, and no home ANDSF rules are available. In this scenario, the mobile communication device(s) 140 will use the visited ANDSF policy for network selection and traffic steering.

In Scenario 5, the mobile communication device(s) 140 is provisioned with RAN rules, an ANDSF policy from a home operator, and an ANDSF policy from a visited operator. In this scenario, the mobile communication device(s) 140 will use the visited ANDSF policy for network selection and traffic steering. In an embodiment, the mobile communication device(s) 140 can use some of the RAN assistance parameters to enhance the ANDSF network selection policies in this scenario.

In Scenario 6, the mobile communication device(s) 140 is provisioned with RAN rules, and no ANDSF rules are available from a home operator or a visited operator. In this scenario, the mobile communication device(s) 140 will use the RAN rules for network selection and traffic steering.

4.2 Methods for Determining Precedence between ANDSF Rules and RAN Rules

Figure 5:
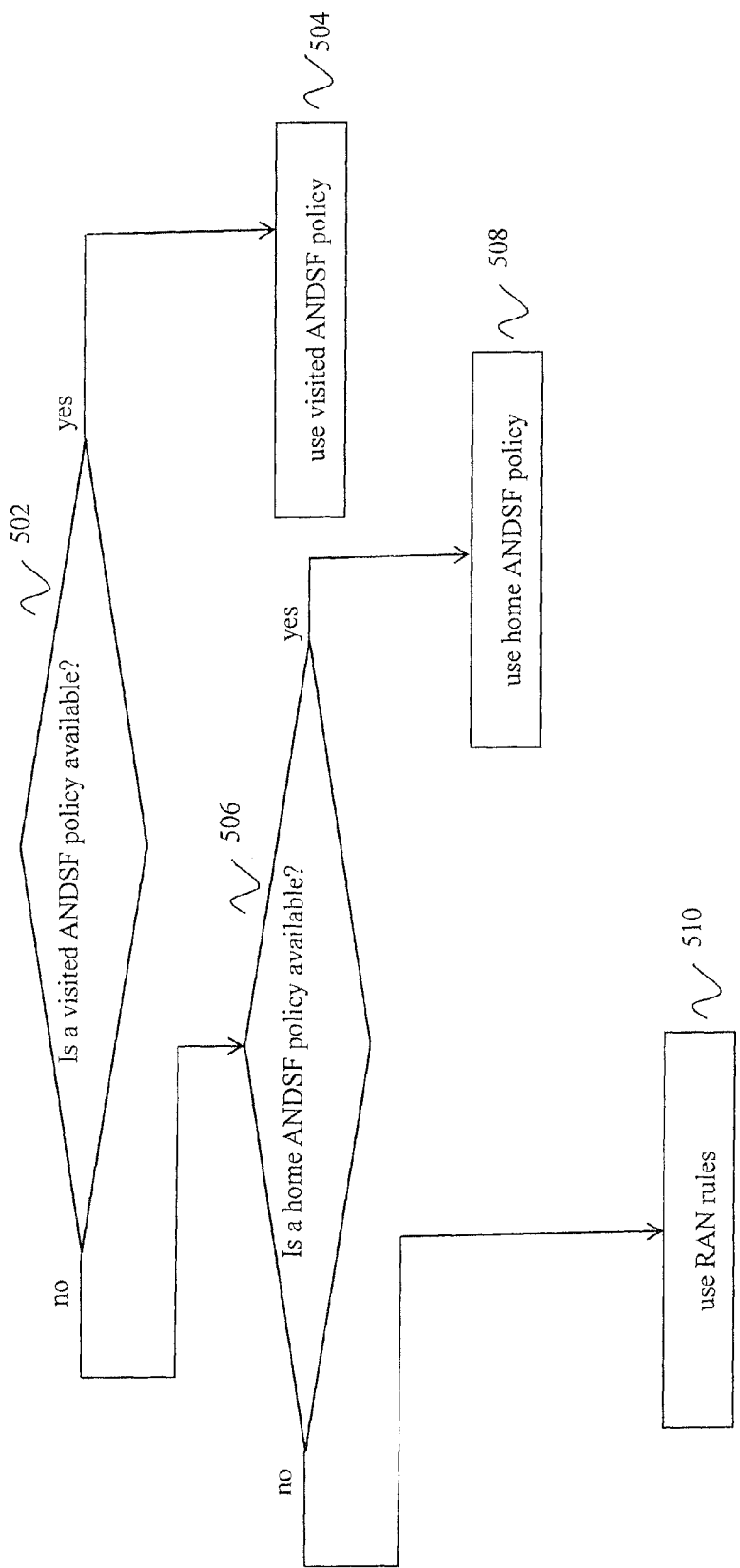
FIG. 5 illustrates a flowchart of a method for determining priority between ANDSF rules and RAN rules in accordance with an embodiment of the present disclosure.

FIG. 5 is a flowchart of a method for determining priority between ANDSF rules and RAN rules in accordance with an embodiment of the present disclosure. As shown by FIG. 5, the mobile communication device(s) 140 is configured to give higher priority to ANDSF rules than RAN rules when ANDSF rules are available. When ANDSF rules are provisioned by a home and a visited operator, the mobile communication device(s) 140 is configured to give higher priority to the ANDSF rules provisioned by the visited operator.

In step 502, the mobile communication device(s) 140 determines whether a visited ANDSF policy is available (and therefore accessible by mobile communication device(s) 140). If a visited ANDSF policy is available (e.g., if the mobile communication device(s) 140 is roaming), the method proceeds to step 504, and the visited ANDSF policy is used for network selection and traffic steering.

If no visited ANDSF policy is available, the method proceeds to step 506, and the mobile communication device(s) 140 determines whether a home ANDSF policy is available. If a home ANDSF policy is available, the method proceeds to step 508, and the home ANDSF policy is used for network selection and traffic steering. If no home ANDSF policy is available, the method proceeds to step 510, and the RAN rules are used for network selection and traffic steering.

In some cases, an ANDSF policy may be available but specific rules of the ANDSF policy may be inactive or invalid. For example, in some cases, even when an ANDSF policy exists, current conditions at the mobile communication device(s) 140 may not satisfy any rules in the ANDSF policy for offloading traffic. In an embodiment, rules in an ANDSF policy have conditions under which they become active (e.g., an offloading rule for mobile communication device(s) 140 may only become active when a certain time or location satisfies the condition for activity of the rule). If no conditions are satisfied for any rule in the ANDSF policy, there a case may arise where there is no active rule.

Additionally, in some cases, even where a certain rule becomes active, it may become invalid (e.g., due to changing conditions). For example, if a rule becomes active at a certain time of day, the rule may become invalid once a certain time threshold has been passed. Additionally, certain rules in an ANDSF policy may only be valid when certain kinds of traffic occur at the mobile communication device(s) 140 (e.g., traffic that matches a certain flow configuration).

In an embodiment, the mobile communication device(s) 140 can first determine whether a rule in the ANDSF policy is active and/or valid before determining that the ANDSF policy should be granted precedence over the RAN rules. If no rule in the ANDSF policy is active and/or valid, the mobile communication device(s) 140 can be configured to "fall back" to the RAN rules in accordance with an embodiment of the present disclosure.

Figure 6:
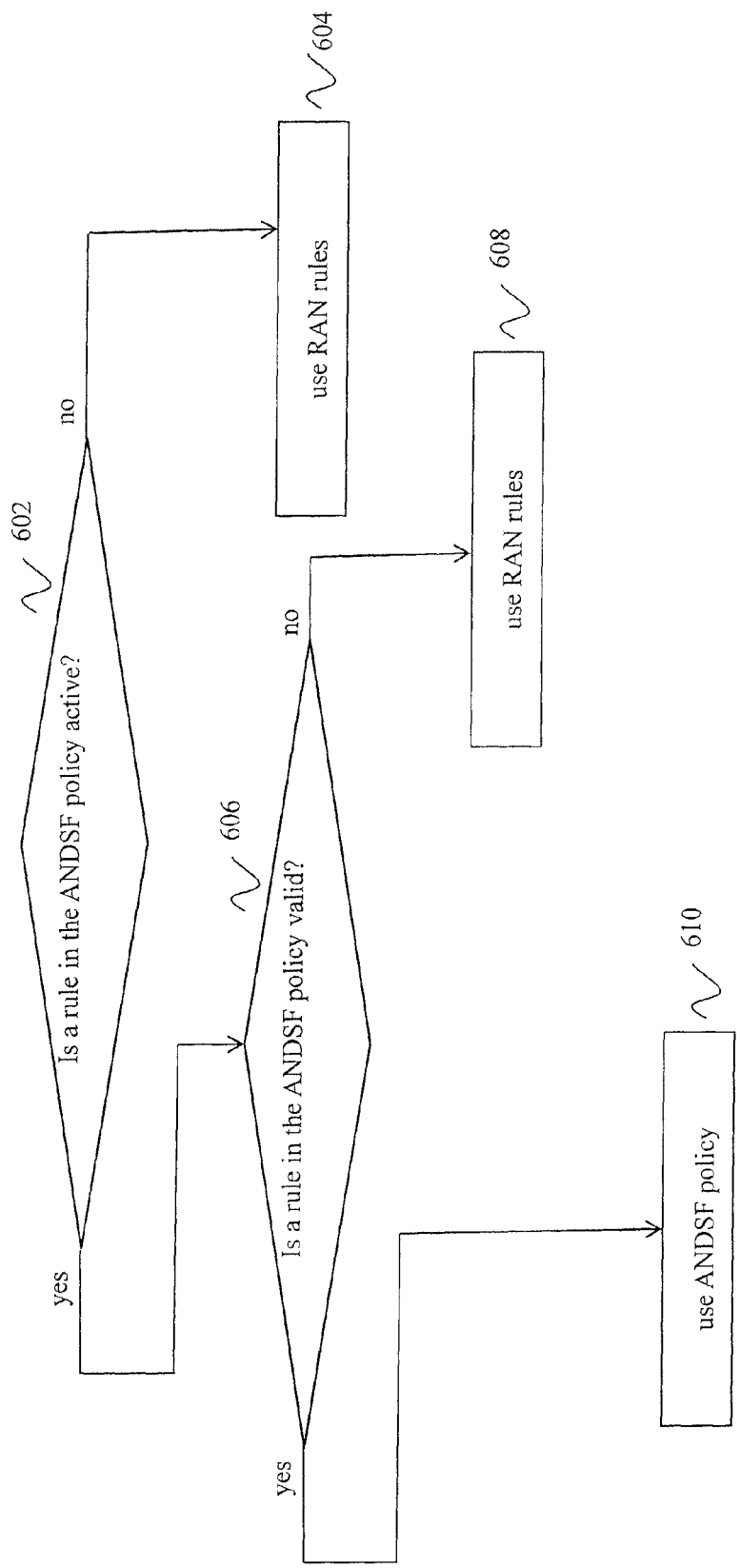
FIG. 6 illustrates a flowchart of a method for determining precedence between ANDSF rules and RAN rules taking into account validity and activity of ANDSF rules in accordance with an embodiment of the present disclosure.

FIG. 6 is a flowchart of a method for determining precedence between ANDSF rules and RAN rules taking into account validity and activity of ANDSF rules in accordance with an embodiment of the present disclosure. In an embodiment, the mobile communication device(s) 140 can be configured to perform the operations of FIG. 6 before deciding to use a home ANDSF policy or a visited ANDSF policy when RAN rules are also available. For example, in an embodiment, the mobile communication device(s) 140 can be configured to perform the operations of FIG. 6 in place of step 504 and/or step 508 of FIG. 5.

In step 602, the mobile communication device(s) 140 determines whether a rule in the ANDSF policy (e.g., a rule for offloading in a home ANDSF policy or a visited ANDSF policy) is active. If no rule is active, the method proceeds to step 604, and the RAN rules are used.

If a rule in the ANDSF policy is active, the method proceeds to step 606, and the mobile communication device(s) 140 determines whether a rule in the ANDSF policy (e.g., a rule for offloading in a home ANDSF policy or a visited ANDSF policy) is valid. If no rule is valid, the method proceeds to step 608, and the RAN rules are used. If a rule in the ANDSF policy is valid, the method proceeds to step 610, and the ANDSF policy is used.

In an embodiment of the present disclosure, an ANDSF policy is used to offload data even if a rule in the ANDSF policy is inactive and/or unavailable. For example, in an embodiment, using ANDSF rules, even when they are inactive and/or unavailable, can lead to more predictable behavior of mobile communication device(s) 140.

Figure 9:
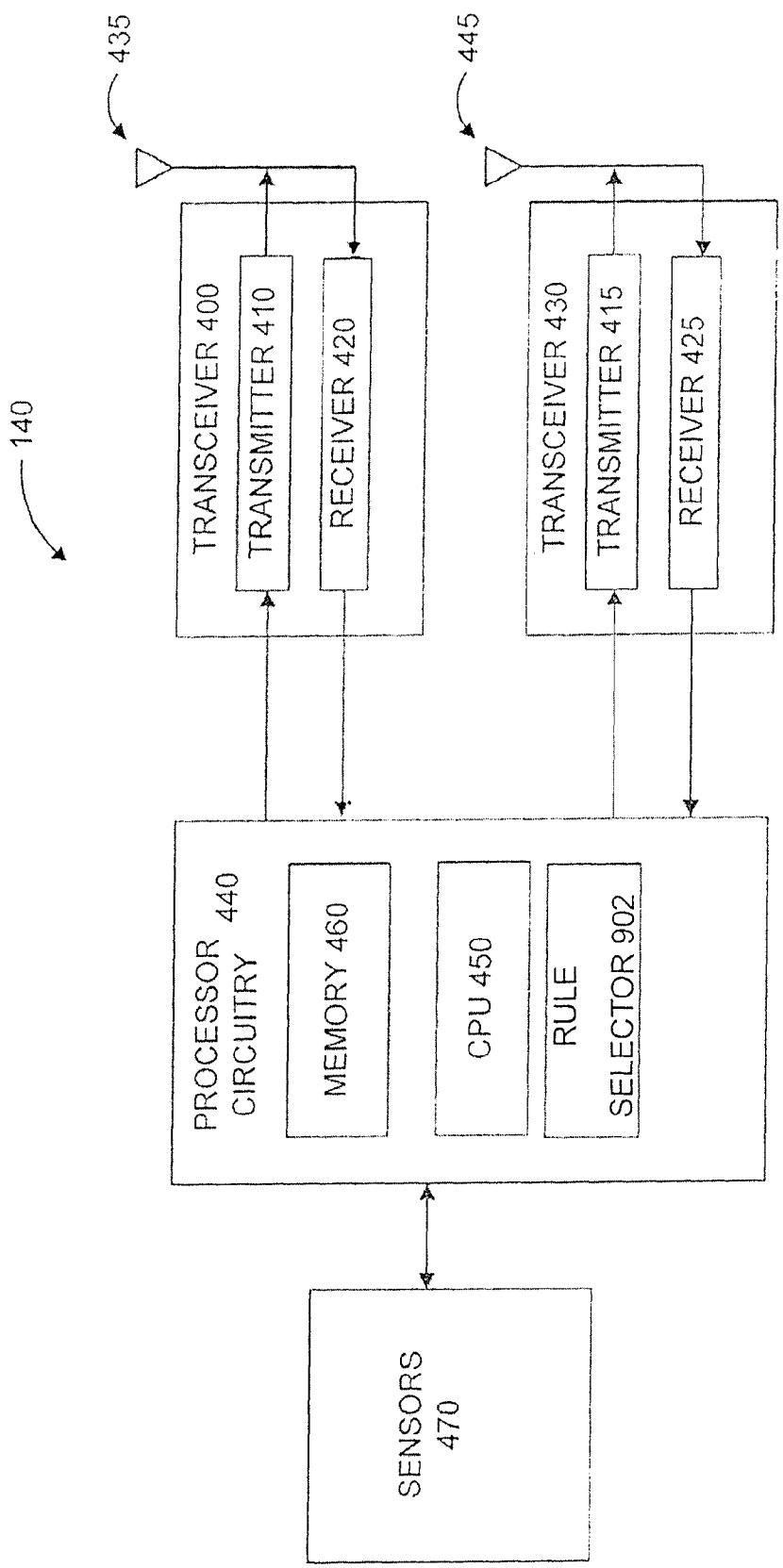
FIG. 9 illustrates a mobile communication device including a rule selector according to an exemplary embodiment of the present disclosure.

In an embodiment, the mobile communication device(s) 140 is configured to implement the method of FIG. 5 and/or FIG. 6. More specifically, the processor circuitry 440 can be configured to implement the method of FIG. 5 and FIG. 6. For example, in an embodiment, the memory 460 of the mobile communication device(s) 140 stores code and/or instructions that, when executed by the CPU 450, causes the CPU 450 to perform the operations shown by FIG. 5 and/or FIG. 6. Alternatively, the mobile communication device(s) 140 can have one or more modules configured to perform the operations shown by FIG. 5 and/or FIG. 6 (e.g., using hardware, digital logic, etc.). For example, FIG. 9 shows mobile communication device(s) 140 including rule selector 902 that is configured to implement the method of FIG. 5 and/or FIG. 6.

5. Determining a Signaling Method for Offload Information

As discussed above, RAN rules can specify conditions that occur at certain thresholds. When a condition of a RAN rule is fulfilled, the base station 120 sends offload information to the mobile communication device(s) 140 to allow the mobile communication device(s) 140 to offload traffic that is deemed to be offloadable by the RAN rule. In an embodiment, this information can notify the mobile communication device(s) 140 about offloadable Access Point Name(s) (APN), number(s), or ID offload information and/or about offloadable bearers (e.g., which Evolved Packet switched System (EPS) bearers are offloadable). For example, in an embodiment, the APN identifies the Packet Data Network (PDN) that the mobile communication device(s) 140 wants to communicate with and a type of service provided by the PDN.

This offload information can be sent to the mobile communication device(s) 140 in a variety of ways. For example, in accordance with embodiments of the present disclosure, offload information can be sent to the mobile communication device(s) 140 using Radio Resource Control (RRC) broadcast signaling, RRC dedicated mode signaling, or Non-access Stratum (NAS) signaling. Embodiments of the present disclosure provide systems and methods that combine the advantages of these signaling methods when offloading information to mobile communication device(s) 140 after a RAN rule has been satisfied.

Figure 7A:
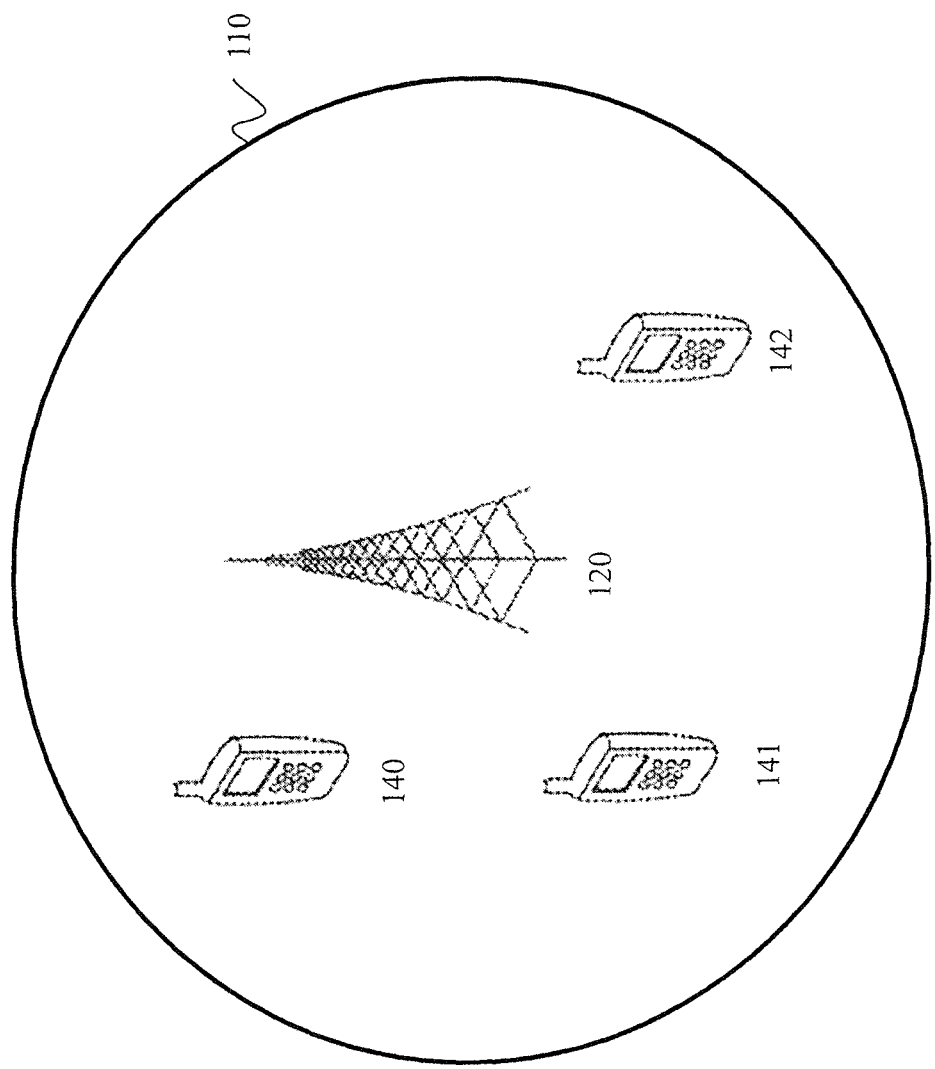
FIG. 7A is a diagram illustrating Radio Resource Control (RRC) broadcast signaling in accordance with an embodiment of the present disclosure.

FIG. 7A is a diagram illustrating RRC broadcast signaling in accordance with an embodiment of the present disclosure. In FIG. 7A, the base station 120 sends a broadcast signal with the offload information rules to all devices (e.g., to the mobile communication device(s) 140, 141, and 142) camped on the serving cell 110. Because this broadcast affects all devices camped on the serving cell 110, each of the mobile communication device(s) 140, 141, and 142 has similar behavior.

Figure 7B:
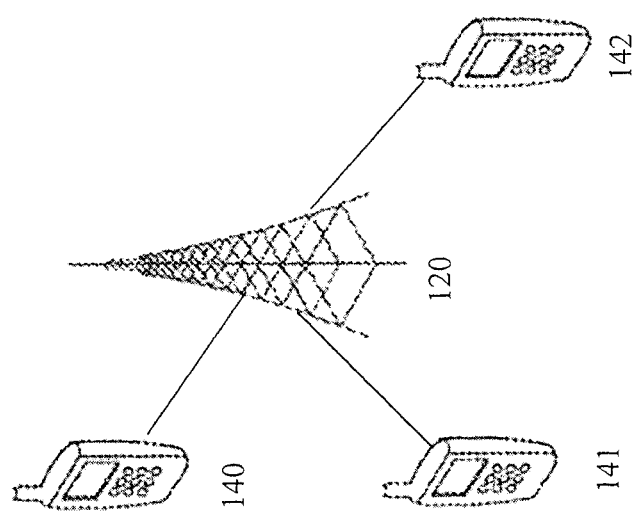
FIG. 7B is a diagram illustrating RRC dedicated mode signaling in accordance with an embodiment of the present disclosure.

FIG. 7B is a diagram illustrating RRC dedicated mode signaling in accordance with an embodiment of the present disclosure. In FIG. 7B, the base station 120 sends a separate, dedicated signal with the offload information to each of the mobile communication devices 140, 141, and 142. In this mode, the offloadable criteria can be set per device (instead of affecting all devices camped on serving cell 110 as in FIG. 7A).

Figure 7C:
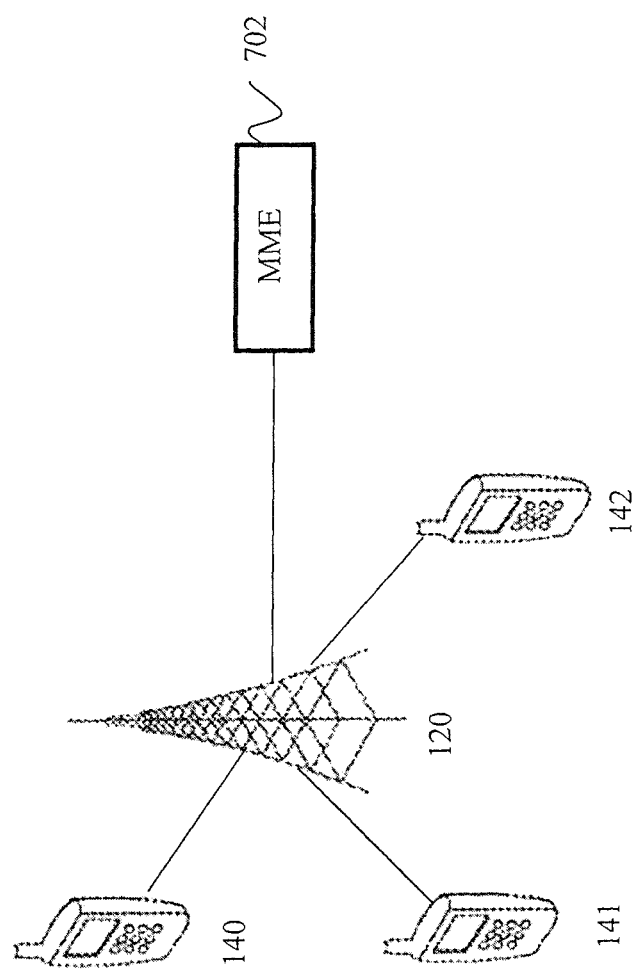
FIG. 7C is a diagram illustrating Non-access Stratum (NAS) signaling in accordance with an embodiment of the present disclosure.

FIG. 7C is a diagram illustrating NAS signaling in accordance with an embodiment of the present disclosure. NAS is a protocol for messages passed between the mobile communication devices and core nodes (e.g., mobile switching center, serving GPRS support node, or Mobility Management Entity (MME)) that is passed transparently through the radio network. As shown in FIG. 7C, the MME 702 sends offload information to the mobile communication devices 140, 141, and 142. Because the decision to send the offload information is taken by the MME 702, the base station 120 is unaware of the offload information sent to the mobile communication devices 140, 141, and 142.

5.1 Advantages and Disadvantages of Signaling Methods

In an embodiment, the MME 702 is connected to a home subscriber server that contains a user profile. One advantage of using NAS signaling is that the MME 702 has access to APN information, user profile information, and EPS bearer information. In an embodiment, the base station 120 does not have access to APN information and/or EPS bearer information when RRC broadcast signaling or RRC dedicated mode signaling is used. Instead, the base station 120 has access to radio bearers identified through QCI Quality of Service Class Identifier (QCI) identifiers. In an embodiment, when QCI identifiers are used to offload information an APN is considered offloadable (e.g., available for offload) if the APN has the given QCI identifiers.

In an embodiment, transmitting offload information using QCI identifiers is not ideal for making certain offloading decisions. For example, for a particular user, a decision may be made to only offload certain types of traffic (e.g., internet PDN traffic) and not traffic corresponding to other types of data. In an embodiment, the base station 120 does not have access to user profile information and does not know the identity of the destination of the PDN packets. Thus, the APN information, user profile information, and EPS bearer information available to the MME 702 are more useful than the information available to base station 120 when sending offload information.

NAS signaling also has some disadvantages, however. For example, in an embodiment, when using NAS signaling, the MME 702 has to keep track of its APN information as well as all the APN information of all devices camped on serving cell 110. In an embodiment, this can be a large amount of information and can be difficult to manage. Further, the base station 120 does not have knowledge of what traffic is being offloaded when NAS signaling is used, so if a particular type of traffic needs to be offloaded, the base station 120 needs to send an indication to the MME 702 to update the list of mobile communication devices camped on serving cell 110. In the case of a handoff from the MME 702 to another MME, the MME 702 will send offload information (e.g. a list of offloadable bearers) to the new serving MME. Further, applying changes to all devices camped on the serving cell 110 can result in a large signaling overhead.

When RRC dedicated signaling is used, the base station 120 has knowledge of what traffic is being offloaded and can customize the offloadable list per subscriber, although the base station 120 does not have knowledge of the subscriber profile. However, applying changes to all mobile communication devices camped on serving cell 110 also results in a large signaling overhead when RRC dedicated signaling is used to offload information. Using RRC broadcast signaling reduces this overhead but cannot apply changes to mobile communication devices individually.

In an embodiment, the base station 120 can consider the advantages and disadvantages of each of these signaling methods and can select an appropriate signaling method (e.g., based on a policy stored in the memory 260). For example, in an embodiment, the base station 120 can select the RRC broadcast signaling method if several devices are camped on the serving cell 110, and reducing signaling overhead is an important concern (e.g., if the number of camped devices exceeds a predetermined threshold set in the policy).

In an embodiment, the base station 120 can select the NAS signaling method if offloading to a particular APN is an important concern and/or if information in the user profile is important for offloading decisions. For example, certain types of offload requests may require more particular offloading information (e.g., a request to only offload certain types of traffic, such as internet PDN traffic, and not traffic corresponding to other types of data). In an embodiment, base station 120 can determine, based on the policy whether APN information and/or user profile information is necessary to satisfy the offload request and can select the NAS signaling method if this is the case.

In an embodiment, the base station 120 can select the RRC dedicated mode signaling method if, for example, it is important to send a dedicated signal to an individual mobile communication device while allowing the base station 120 to maintain knowledge of what traffic is being offloaded. Thus, in accordance with embodiments of the present disclosure, the policy can specify a variety of rules and conditions for selecting a signaling method for sending offload information, and the base station 120 can analyze this policy and select a signaling method accordingly.

5.2 Combining Functionality of Base Station and MME Signaling Procedures

As described above, normally, the base station 120 does not have access to EPS bearer information (e.g., information that describes bearers between a PDN and mobile communication device(s) 140). Rather, the base station 120 has access to radio bearer information (e.g., information that describes bearers between base station 120 to mobile communication device(s) 140). Embodiments of the present disclosure enable the base station 120 to gain access to EPS bearer information so that the base station 120 can make a decision whether offload data associated with offloadable bearers, and to send offload information containing the EPS bearer information.

Embodiments of the present disclosure provide systems and methods using a combination of MME and base station procedures that can be used by both the base station 120 and the mobile communication device 140 to make an offload decision. Systems and methods according to embodiments of the present disclosure enable base station 120 to obtain EPS bearer information available to the MME 702. The base station 120 can and use this EPS bearer information to broadcast a signal to all devices camped on the serving cell 110 or can use this EPS bearer information to send a dedicated signal to the mobile communication device(s) 140. Thus, embodiments of the present disclosure combine the advantages of NAS signaling (e.g., access to EPS bearer information) and RRC broadcast signaling (e.g., the ability to simultaneously apply changes to multiple mobile communication devices camped on a serving cell).

For example, when NAS signaling is used to send offload information, the MME 702 sends EPS bearer information to the mobile communication device(s) 140 via the base station 120. For example, in an embodiment, the MME 702 can send identifiers that identify a plurality of EPS bearers (e.g., including EPS bearers to be offloaded and EPS bearers that are available for offloading data). In an embodiment, this EPS bearer information is associated with one or more offloadable indicators that indicate whether a particular EPS bearer is offloadable or not. Using this knowledge, the base station 120 can build a map of EPS bearers and corresponding offloadable indicators.

In an embodiment, once an offload condition exists within the serving cell 110, the base station 120 uses its obtained EPS bearer information to send offload information. For example, an offload condition can exist when signal strength in the serving cell is low for a particular mobile device, when one or more mobile devices are located at the edge of the serving cell, and/or when interference in the serving cell exceeds a predetermined threshold for one or more mobile devices. When the base station 120 detects an offload condition, the base station 120 can examine the map of EPS bearers and corresponding offloadable indicators to determine those bearers that can be offloaded (e.g., data offloaded from the offloadable bearers). After which, the base station 120 can send offload information to the mobile communication device(s) 140 in response so that data can be offloaded that is being carried by the corresponding offloadable bearers.

The base station 120 can send the offload information using a variety of signaling methods. For example, in response to detecting an offload condition, the base station 120 can broadcast a signal containing the offload information to all devices camped on the serving cell. Alternatively, the base station 120 can send a dedicated signal to the mobile communication device(s) 140 containing the offload information. For example, if an offload condition exists for the mobile communication device(s) 140, the base station 120 can determine the EPS bearers and corresponding offloadable indicator(s) so that data can be offloaded. Using this information, the base station 120 can then send a signal that enables the mobile communication device(s) 140 to offload to a particular APN. For example, in an embodiment, when an offload condition exists in a serving cell, the base station 120 can send offload information so that data assigned to the offloadable bearers can be offloaded to one or more EPS bearers that were not previously used to send the data.

5.3 Signaling Using a Combination of Base Station and MME Procedures

Figure 8:
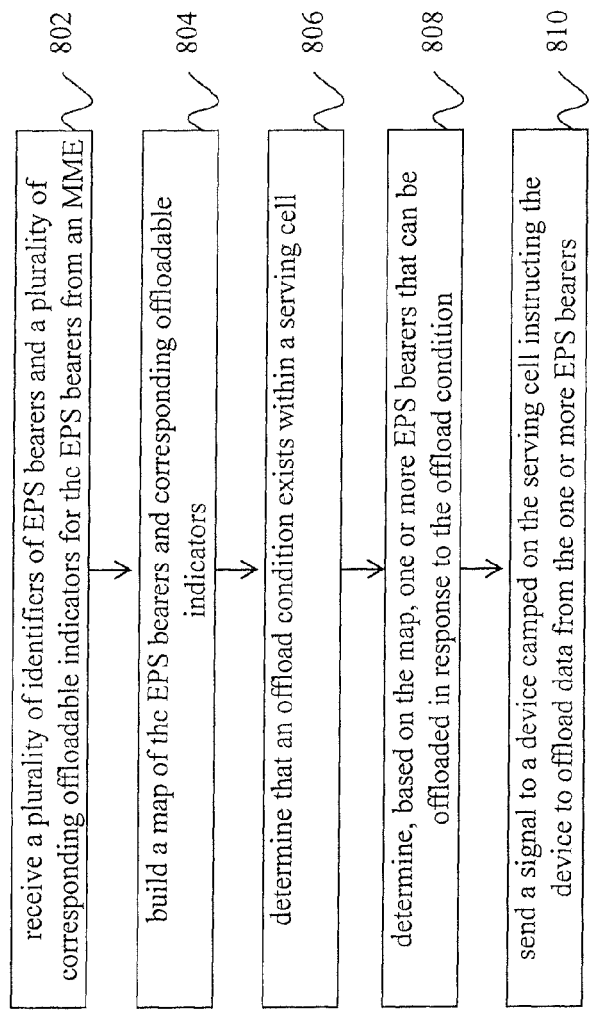
FIG. 8 is a flowchart of a method for transmitting offload information containing EPS bearer information to a mobile communication device in accordance with an embodiment of the present disclosure.

FIG. 8 is a flowchart of a method for transmitting offload information containing EPS bearer information to a mobile communication device in accordance with an embodiment of the present disclosure. In step 802, the base station 120 receives a plurality of identifiers that identify EPS bearers and a plurality of corresponding offloadable indicators from the MME 702. For example, in an embodiment, the base station 120 receives the EPS bearers and corresponding offloadable indicators as offload information is sent from the MME 702 to the mobile communication device(s) 140 and 141. In step 804, the base station 120 builds a map of the EPS bearers and corresponding offloadable indicators and stores the map in the memory 260.

In step 806, the base station 120 determines that an offload condition exists in the serving cell 110. For example, an offload condition can exist when signal strength in the serving cell is low for a particular mobile device, when one or more mobile devices are located at the edge of the serving cell, and/or when interference in the serving cell exceeds a predetermined threshold for one or more of the mobile communication device(s) 140. As described above, the base station 120 has access to radio bearer information corresponding to the offload condition but does not have access to EPS bearer information corresponding to the offload condition without receiving information from the MME 702. The base station 120 can thus use the information obtained from the MME 702 to determine the EPS bearers that should be offloaded in response to the offload condition.

In step 808, the base station 120 determines, based on the map, one or more EPS bearers that can be offloaded in response to the offload condition. For example, in an embodiment, the offloadable indicators in the map determine which EPS bearers are offloadble. In step 810, the base station 120 sends offload information to one or more mobile communication device(s) 140, 141, and 142 camped on the serving cell instructing the one or more mobile communication device(s) 140, 141, and 142 to offload data from the one or more EPS bearers. For example, in and embodiment, the base station 120 broadcasts a signal to all devices (e.g., the mobile communication device(s) 140, 141, and 142) camped on serving cell 110 instructing the devices to offload to one or more APNs that may be associated with EPS bearers that are different from the offloadable EPS bearers.

Figure 10:
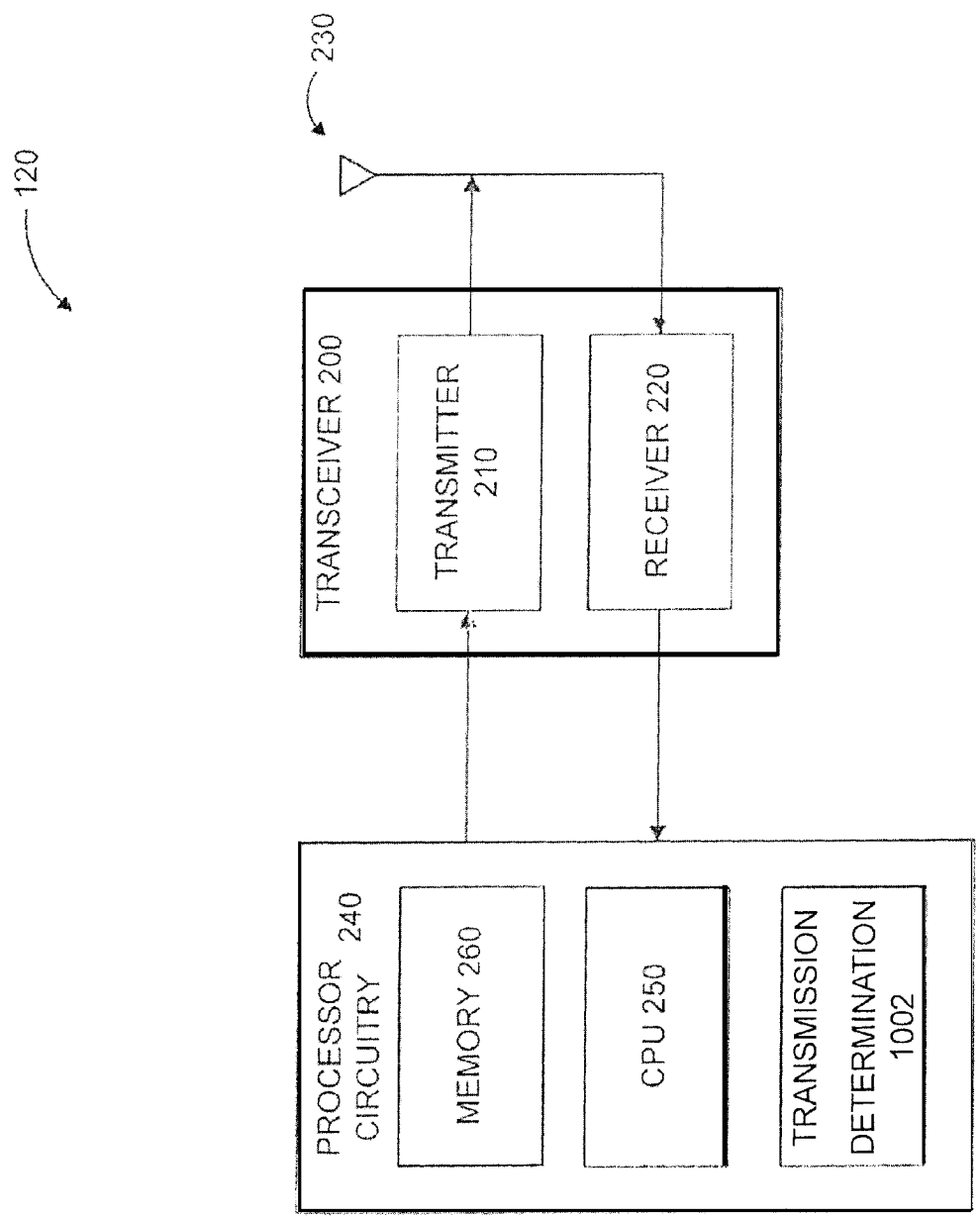
FIG. 10 illustrates a base station including a transmission determination module according to an exemplary embodiment of the present disclosure.

In an embodiment, the base station 120 is configured to implement the method of FIG. 8. More specifically, the processor circuitry 240 can be configured to implement the method of FIG. 8. For example, in an embodiment, the memory 260 of the base station 120 stores code that, if executed by the CPU 250, causes the CPU 250 to perform the operations shown by FIG. 8. Alternatively, the base station 120 can have one or more modules configured to perform the operations shown by FIG. 8 (e.g., using hardware, software, digital logic, etc.). Further, in an embodiment, the base station 120 can be configured (e.g., using hardware, digital logic, etc.) to receive the signal broadcast in step 810 of FIG. 8 and to offload to the APN in response to receiving the signal. For example, FIG. 10 shows base station 120 including transmission determination module 1002 that is configured to implement the method of FIG. 8 and/or is configured to select either a RRC dedicated signaling method, RRC broadcast signaling method, or NAS signaling method.

6. Conclusion

It is to be appreciated that the Detailed Description, and not the Abstract, is intended to be used to interpret the claims. The Abstract may set forth one or more but not all exemplary embodiments of the present disclosure as contemplated by the inventor(s), and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Any representative signal processing functions described herein can be implemented using computer processors, computer logic, application specific circuits (ASIC), digital signal processors, etc., as will be understood by those skilled in the art based on the discussion given herein. Accordingly, any processor that performs the signal processing functions described herein is within the scope and spirit of the present disclosure.

The above systems and methods may be implemented as a computer program executing on a machine, as a computer program product, or as a tangible and/or non-transitory computer-readable medium having stored instructions. For example, the functions described herein could be embodied by computer program instructions that are executed by a computer processor or any one of the hardware devices listed above. The computer program instructions cause the processor to perform the signal processing functions described herein. The computer program instructions (e.g. software) can be stored in a tangible non-transitory computer usable medium, computer program medium, or any storage medium that can be accessed by a computer or processor. Such media include a memory device such as a RAM or ROM, or other type of computer storage medium such as a computer disk or CD ROM. Accordingly, any tangible non-transitory computer storage medium having computer program code that cause a processor to perform the signal processing functions described herein are within the scope and spirit of the present disclosure.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments.

What is claimed is:

1. A base station, comprising:
a transceiver; and
processor circuitry coupled to the transceiver, wherein the processor circuitry is configured to:
   determine that data from a mobile communication device camped on a serving cell of the base station should be offloaded from a first network to a second network,
   select, based on a policy stored in a memory of the base station, a signaling method from a plurality of available signaling methods, and
   send a signal using the selected signaling method to the mobile communication device that enables the mobile communication device to offload the data,
wherein the plurality of available signaling methods include radio resource control (RRC) broadcast signaling, RRC dedicated mode signaling, and Non-Access Stratum (NAS) signaling, and
wherein the data includes a plurality of data traffic types, and wherein the processor circuitry is configured to select, based on the policy, the NAS signaling method in response to determining that only a particular type of the plurality of types of data traffic is to be offloaded from the first network to the second network.

2. The base station of claim 1, wherein the processor circuitry is configured to select, based on the policy, the RRC dedicated mode signaling method in response to determining that a dedicated signal should be sent to the mobile communication device while allowing the base station to maintain knowledge of what traffic is being offloaded.

3. The base station of claim 1, wherein the processor circuitry is configured to select, based on the policy, the NAS signaling method in response to determining that data should be offloaded to a specified Access Point Name (APN).

4. The base station of claim 1, wherein the processor circuitry is configured to select, based on the policy, the NAS signaling method in response to determining that a user profile is needed to satisfy the data offload.

5. The base station of claim 1, wherein the particular type of traffic is Internet traffic.

6. The base station of claim 1, wherein the policy stored in the memory is based on Access Network Discovery and Selection Function (ANDSF) rules.

7. A base station, comprising:
a transceiver; and
processor circuitry coupled to the transceiver, wherein the processor circuitry is configured to:
   determine that data from a mobile communication device camped on a serving cell of the base station should be offloaded from a first network to a second network,
   select, based on a policy stored in a memory of the base station, a signaling method from a plurality of available signaling methods, and
   send a signal using the selected signaling method to the mobile communication device that enables the mobile communication device to offload the data,
wherein the processor circuitry is configured to select, based on the policy, a Radio Resource Control (RRC) broadcast signaling method in response to determining that a number of devices camped on the serving cell of the base station exceeds a predetermined threshold.

8. A method performed by a base station, comprising:
determining that data from a mobile communication device camped on a serving cell of the base station should be offloaded from a first network to a second network;
selecting, based on a policy stored in a memory of the base station, a signaling method from a plurality of available signaling methods; and
sending a signal using the selected signaling method to the mobile communication device that enables the mobile communication device to offload the data,
wherein the plurality of available signaling methods include radio resource control (RRC) broadcast signaling procedure, RRC dedicated mode signaling procedure, and Non-Access Stratum signing procedure, and
wherein the selecting, based on the policy, includes selecting the RRC broadcast signaling procedure in response to determining that a number of devices camped on the serving cell of the base station exceeds a predetermined threshold.

9. The method of claim 8, wherein the selecting, based on the policy, includes selecting the RRC dedicated mode signaling procedure in response to determining that a dedicated signal should be sent to the mobile communication device while allowing the base station to maintain knowledge of what traffic is being offloaded.

10. The method of claim 8, wherein the selecting, based on the policy, includes selecting the Non-access Stratum (NAS) signaling procedure in response to determining that data should be offloaded to a specified Access Point Name (APN).

11. The method of claim 8, wherein the selecting, based on the policy, includes selecting the NAS signaling procedure in response to determining that a user profile is needed to satisfy the data offload.

12. The method of claim 8, wherein the data includes a plurality of data traffic types, and wherein the selecting, based on the policy, includes selecting the NAS signaling procedure in response to determining that only a particular type of the plurality of types of data traffic are to be offloaded from the first network to the second network.

13. The method of claim 12, wherein the particular type of traffic is Internet traffic.

14. The method of claim 8, wherein the policy stored in the memory is based on Access Network Discovery and Selection Function (ANDSF) rules.

15. A non-transitory computer-readable storage medium comprising a set of computer-readable instructions stored thereon, which, when executed by a processor, cause the processor to perform a method, the method comprising:
determining that data from a mobile communication device camped on a serving cell of a base station should be offloaded from a first network to a second network;
selecting, based on a policy stored in a memory of the base station, a signaling method from a plurality of available signaling methods; and
sending a signal using the selected signaling method to the mobile communication device that enables the mobile communication device to offload the data, wherein the plurality of available signaling methods include radio resource control (RRC) broadcast signaling, RRC dedicated mode signaling, and Non-Access Stratum signing, and wherein the selecting, based on the policy, includes selecting the RRC broadcast signaling procedure in response to determining that a number of devices camped on the serving cell of the base station exceeds a predetermined threshold.

16. The non-transitory computer-readable storage medium of claim 15, wherein the selecting, based on the policy, includes selecting the RRC dedicated mode signaling procedure in response to determining that a dedicated signal should be sent to the mobile communication device while allowing the base station to maintain knowledge of what traffic is being offloaded.

17. The non-transitory computer-readable storage medium of claim 15, wherein the selecting, based on the policy, includes selecting the NAS signaling procedure in response to determining that data should be offloaded to a specified Access Point Name (APN).

18. The non-transitory computer-readable storage medium of claim 15, wherein the selecting, based on the policy, includes selecting the NAS signaling procedure in response to determining that a user profile is needed to satisfy the data offload.

19. The non-transitory computer-readable storage medium of claim 15, wherein the data includes a plurality of data traffic types, and wherein the selecting, based on the policy, includes selecting the NAS signaling procedure in response to determining that only a particular type of the plurality of types of data traffic is to be offloaded from the first network to the second network.

20. The non-transitory computer-readable storage medium of claim 15, wherein the policy stored in the memory is based on Access Network Discovery and Selection Function (ANDSF) rules.

* * * * *